(12) United States Patent
Sabo et al.

(10) Patent No.: US 10,414,678 B2
(45) Date of Patent: Sep. 17, 2019

(54) NITROGEN-REDUCING WASTEWATER TREATMENT SYSTEM

(71) Applicant: A.K. Industries, Inc., Plymouth, IN (US)

(72) Inventors: Stephen Sabo, Plymouth, IN (US); Steven Davis, Plymouth, IN (US); James Conley, Plymouth, IN (US)

(*) Notice: Subject to any disclaimer, the term of this patent is extended or adjusted under 35 U.S.C. 154(b) by 3 days.

(21) Appl. No.: 15/629,206

(22) Filed: Jun. 21, 2017

(65) Prior Publication Data

US 2017/0283291 A1 Oct. 5, 2017

Related U.S. Application Data

(63) Continuation of application No. 14/134,860, filed on Dec. 19, 2013.

(60) Provisional application No. 61/739,130, filed on Dec. 19, 2012.

(51) Int. Cl.
*C02F 3/30* (2006.01)
*C02F 3/12* (2006.01)

(52) U.S. Cl.
CPC ............ *C02F 3/302* (2013.01); *C02F 3/1242* (2013.01); *C02F 2209/10* (2013.01); *C02F 2209/40* (2013.01); *Y02W 10/15* (2015.05)

(58) Field of Classification Search
CPC .......... C02F 3/302; C02F 3/1242; C02F 3/30; C02F 2209/40; C02F 2209/10; C02F 2209/005; C02F 2209/11; Y02W 10/15; Y02W 10/10
USPC ....... 210/142, 418, 739, 745, 605, 620–623, 210/630, 220
See application file for complete search history.

(56) References Cited

U.S. PATENT DOCUMENTS

| | | | |
|---|---|---|---|
| 5,647,986 A * | 7/1997 | Nawathe | C02F 3/006 210/195.3 |
| 5,888,394 A * | 3/1999 | Jan | C02F 3/006 210/104 |
| 7,011,757 B1 * | 3/2006 | Reid | C02F 3/302 210/605 |

* cited by examiner

*Primary Examiner* — Nam X Nguyen
*Assistant Examiner* — Julia L. Wun
(74) *Attorney, Agent, or Firm* — Botkin & Hall, LLP

(57) ABSTRACT

A wastewater treatment system is provided having a pretreatment tank which receives wastewater from a wastewater source, and an aeration tank which is in fluid communication with the pretreatment tank. A recirculation pump is carried in the aeration tank and returns wastewater from the aeration tank to the pretreatment tank. The recirculation pump returns the wastewater according to a recirculation ratio R:I where R is the volumetric flow rate of wastewater through the recirculation pump and I is average volumetric flow rate of wastewater entering the pretreatment tank. A control panel cycles the recirculation pump on and off according to the recirculation ratio.

5 Claims, 2 Drawing Sheets

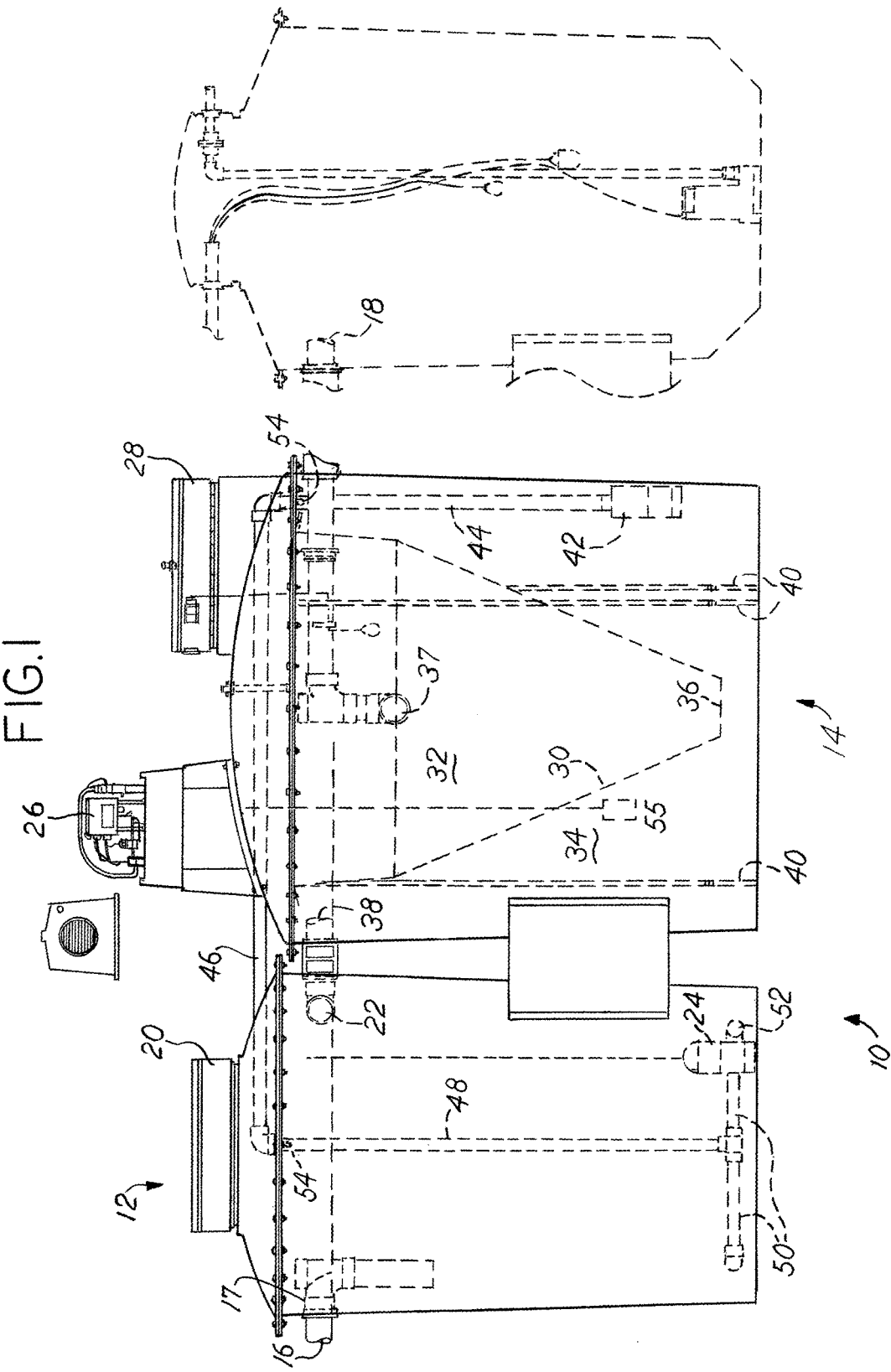

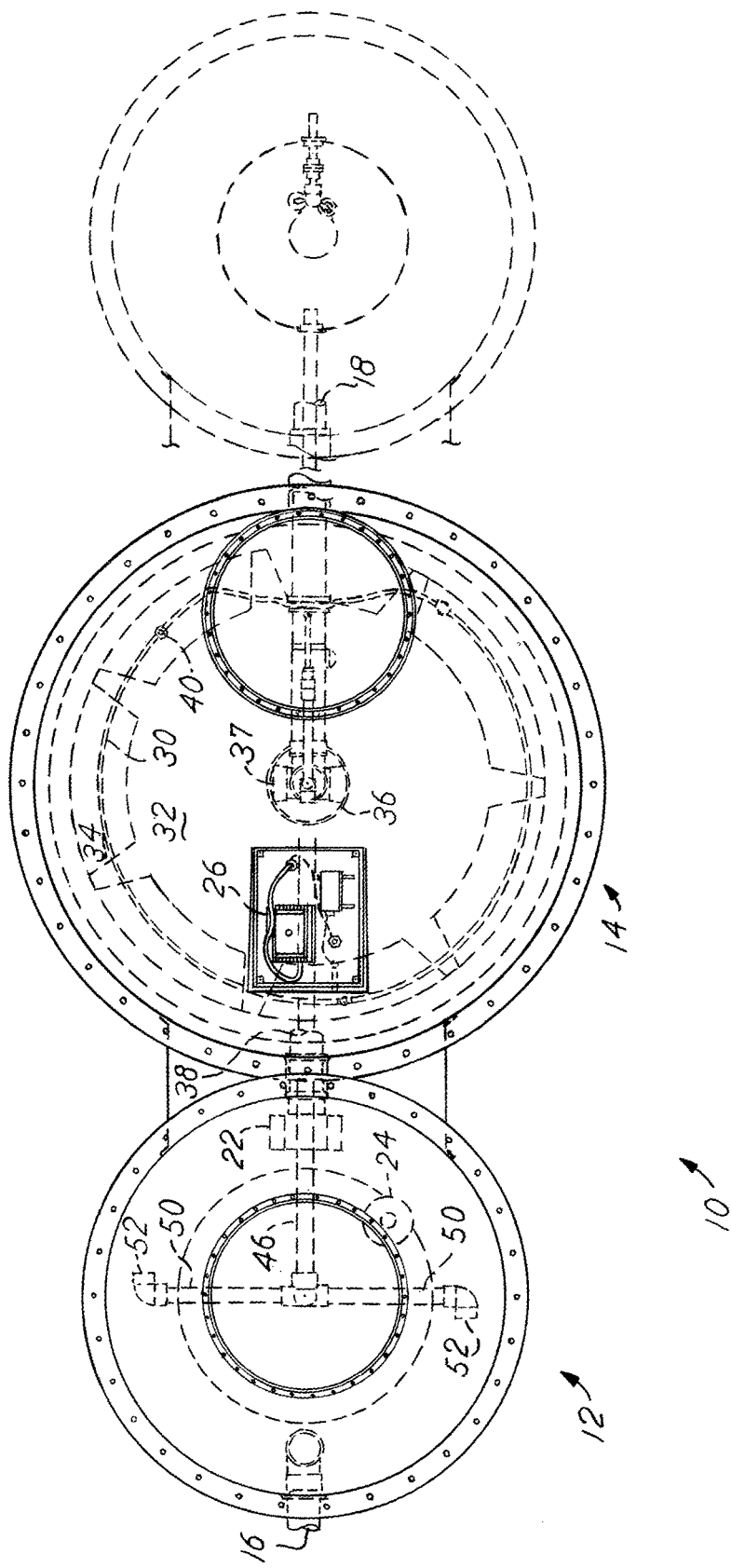

NITROGEN-REDUCING WASTEWATER TREATMENT SYSTEM

CROSS REFERENCE TO RELATED APPLICATIONS

This application is a continuation-in-part claiming the benefit of Utility application Ser. No. 14/134,860 filed Dec. 19, 2013, which claims the benefit of U.S. Provisional Application No. 61/739,130, filed Dec. 19, 2012, the disclosures of which are hereby incorporated by reference.

BACKGROUND OF THE INVENTION

Home wastewater treatment is an economical option for buildings which are located in areas without access to a city sewage system, or where the costs of hooking the building into a municipal sewage system are prohibitive. Home wastewater treatment systems perform similar functions as a sewage plant, but on a much smaller scale. These systems are typically located underground. After the wastewater has been treated it is typically discharged as waste on the property. It is essential that the wastewater is processed sufficiently so that the discharged water does not pose a threat to the environment.

In some geographical regions, wastewater discharged from a home wastewater treatment system—the wastewater effluent—must contain reduced nitrogen levels. When wastewater effluent contains excess amounts of nitrogen-based compounds, and when such wastewater effluent enters waterways, eutrophication, or hypertrophication can result. Eutrophication is the response of an ecosystem to excess artificial natural or artificial substances. One example of eutrophication is the increase of phytoplankton in a body of water, such increase can result in a "bloom" or bright green coloring of the water. Not only does eutrophication discolor the water, but it also disrupts the ecosystem, and can deplete the oxygen levels in the water, which in turn can cause natural species, such as fish, to reduce in numbers or die off.

There are several types of nitrogen which may be present in wastewater and which may need to be reduced, such as ammonia, nitrate, nitrite and organically-bound nitrogen. Total Kjeldahl Nitrogen (TKN) is a test method that measures the combination of organically-bound nitrogen and ammonia. Total Nitrogen (TN) is the sum of the TKN and nitrate and nitrite. To prevent eutrophication and other problems related to excess nitrogen, it is desired that the TN in the wastewater effluent is reduced. It is desired that the TN in the wastewater effluent be reduced by a minimum of 75% relative the TN of the wastewater influent.

One way to reduce nitrogen is through the use of a combination of aerobic and anaerobic bacteria. One suitable pathway of bacteria-aided nitrogen reduction is described as follows. The bacteria reduce ammonia to nitrite, and those or other bacteria reduce nitrite to nitrate, finally the nitrate is denitrified into molecular nitrogen, $N_2$ by bacteria. The molecular nitrogen bubbles out of the system, which results in an overall reduction in the nitrogen content in the wastewater. The final step of denitrification generally requires anaerobic conditions, while the other steps typically require aerobic conditions. As such, the wastewater treatment system must be designed to oscillate between aerobic and anaerobic conditions such that all phases of the nitrogen-reduction process may be achieved.

At the same time, the wastewater treatment system must be suitable for performing its primary function, which is to process the waste found in the wastewater. Typically, such waste is processed by bacteria which gasify nitrogen compounds into atmospheric nitrogen and carbon compounds into carbon dioxide.

As such, an improved home wastewater treatment system is needed which is suitable to both process the waste in the wastewater and to reduce the TN in the wastewater.

SUMMARY OF THE INVENTION

The present disclosure describes a wastewater treatment system which reduces both the waste content and the nitrogen levels in the wastewater effluent. The wastewater treatment system described herein includes a pretreatment tank and an aeration tank. The pretreatment tank provides an anaerobic environment which allows solids to settle out of the wastewater and encourages the growth of anaerobic bacteria which digest the waste in the wastewater. The aeration tank includes diffusers which add air to the wastewater therein, which air oxygenates the wastewater, thereby encouraging the growth of aerobic bacteria which aid in further digesting the waste contained in the wastewater. A recirculation pump is included in the aeration tank and pumps a portion of the wastewater from the aeration tank back to the pretreatment tank. As such, a portion of the wastewater in the aeration tank is returned to the pretreatment tank. The recirculation pump is activated by a controller such that the recirculation pump cycles on and off according to the flow rate of wastewater into the wastewater treatment system. The result is an environment that favors both wastewater treatment and nitrogen reduction.

BRIEF DESCRIPTION OF THE DRAWINGS

A preferred embodiment of this invention has been chosen wherein:

FIG. 1 is side view of the wastewater treatment system showing internal components in dotted lines and an optional pump tank shown in dotted lines; and FIG. 2 is a top view of the wastewater treatment system of FIG. 1 showing internal components in dotted lines and an optional pump tank shown in dotted lines.

DESCRIPTION OF THE PREFERRED EMBODIMENT

Referring now to FIG. 1, the present disclosure describes a wastewater treatment system 10 which includes a pretreatment tank 12 and an aeration tank 14. The pretreatment tank 12 and the aeration tank 14 are liquid holding vessels which are in fluid communication with one another and serve the purpose of treating wastewater. Pretreatment tank 12 includes an inlet 16 which accepts wastewater influent into the wastewater treatment system 10. The inlet 16 is in fluid communication with a wastewater source, such as a residential home, though the application of the wastewater treatment system 10 is not limited to residential uses. The aeration tank 14 includes an outlet 18 which discharges wastewater effluent out of the wastewater treatment system 10. The wastewater effluent discharged from the outlet 18 is typically dispersed into the ground through a drip field, though other discharge pathways are contemplated, and this description is not limited thereto. Further, in some instances a pump tank accepts the effluent from the outlet 18, which pump tank doses the flow rate of the effluent, but again, the present description is not limited thereto.

Referring now to the pretreatment tank 12, the pretreatment tank 12 is a tank which preferably includes a riser 20, such that the pretreatment tank 12 may be buried underground with the riser 20 serving as an access portal for the tank. The pretreatment tank 12 includes a pretreatment tank outlet 22 which is preferably positioned at the same vertical height as the inlet 16, such that gravity moves the wastewater out of the outlet 22. A mixer pump 24 is positioned within the pretreatment tank 12. The mixer pump 24 is connected to a control panel 26 which activates and deactivates the mixer pump 24 according to defined parameters, such as the flow rate of the wastewater into the pretreatment tank, a defined schedule, or other parameters. Alternatively, the mixer pump 24 operates continuously. The mixer pump 24 serves to mix or circulate wastewater within the pretreatment tank 12. The mixer pump 24 may be operated throughout the life of wastewater treatment system 10, but is particularly important during the start-up phase of the treatment system. The mixer pump 24 helps to ensure good mixing in the pretreatment tank 12. Such mixing is especially important during the start-up phase of the wastewater treatment system 10. During such start-up phase, to achieve good results in reducing total nitrogen ("TN"), it is important that a sufficiently large colony of bacteria is formed in the pretreatment tank 12, and mixing helps to encourage such bacteria growth. Once the bacteria colony has become established (which can take 4-8 weeks after startup), the mixer pump 24 can be deactivated and/or removed from the pretreatment tank 12. The mixer pump 24 is used initially agitate the mixed liquor in the pretreatment tank. This agitation breaks up larger chunks of waste into smaller pieces to maximize the surface area upon which bacteria can act. As will be discussed further, the pretreatment tank 12 of the present invention is used to create an environment in which facultative bacteria can thrive.

Referring now to the aeration tank 14, the aeration tank 14 is a tank, suitable for housing a fluid, which preferably includes a riser 28, such that the aeration tank 14 may be buried underground with the riser 28 serving as an access portal for the tank. The aeration tank 14 includes a cone 30 which partitions the tank into a pair of chambers: an inner chamber 32 defined as the area within the cone 30 and an outer chamber 34 defined as the area outside the cone 30. The cone 30 is preferably frusto-conical, having an opening 36 which allows fluid communication between the inner chamber 32 and the outer chamber 34. An aeration tank outlet 37 is positioned proximate the upper end of the cone 30, which outlet is in fluid communication with the outlet 18 of the wastewater treatment system 10. The aeration tank 14 includes an aeration tank inlet 38 which is in fluid communication with the pretreatment tank outlet 22. The aeration tank inlet 38 is positioned near the upper end of the outer chamber 34. In this way, the aeration tank 14 includes a fluid pathway that begins at the aeration tank inlet 38, passes through the outer chamber 34, passes up through the opening 36 of the cone 30 into the inner chamber 32, and then out through the aeration tank outlet 37; such fluid pathway is gravity fed, whereby the aeration tank inlet 38 is at the same vertical height as the outlet 18.

One or more diffusers 40 are present in aeration tank 14, preferably in the outer chamber 34 near the floor of the aeration tank 14. The diffusers 40 emit air into aeration tank 14, at least a portion of such air will contain oxygen, thereby oxygenating the wastewater. The diffusers 40 are connected by air supply lines to an air source. The air supply lines are preferably connected to an air pump which forces the air through the diffusers 40. Such air pump is electrically connected to the control panel 26. The control panel 26 cycles the air pump on and off to control the rate at which air is emitted from the diffusers 40. By oxygenating the wastewater, an aerobic condition is favored in the aeration tank 14, which encourages the growth of aerobic bacteria. The aerobic bacteria aids in digesting the waste in the wastewater in the aeration tank 14. Adding air increases the speed of digestion because the growth rate of aerobic bacteria is much greater than anaerobic bacteria. Aerobic bacteria also aids in the nitrification of the wastewater in the aeration tank 14. The nitrifying bacteria are obligate aerobes.

A recirculation pump 42 is positioned in the aeration tank 14, preferably in the outer chamber 34. The recirculation pump 42 is commonly submersible. The recirculation pump 42 draws in wastewater from the aeration tank 14 and pumps the wastewater through a recirculation pipe to the pretreatment tank 12. This water is drawn from the outer chamber 34 of the aeration tank 14, which is an aeration zone where aerobic respiration occurs. The recirculation pipe is preferably formed from a first recirculation pipe 44, a connecting pipe 46 and a second recirculation pipe 48, which together form a pathway by which wastewater is pumped from the aeration tank 14 to the pretreatment tank 12. In the preferred embodiment, the first recirculation pipe 44 is joined to a first end of the connecting pipe 46 by a connector, such as an elbow. Similarly, it is preferred that a second end of the connecting pipe 46 is joined to the second recirculation pipe 48 by a connector, such as an elbow. The first recirculation pipe 44 and the second recirculation pipe 48 are oriented generally vertically—or roughly parallel with the sidewalls of the pretreatment and aeration tanks 12, 14. The connecting pipe 46 is oriented generally horizontally—or roughly perpendicular to the first and second recirculation pipes 44, 48. Together, the first recirculation pipe 44, the connecting pipe 46 and the second recirculation pipe 48 are U-shaped with the connecting pipe 46 positioned at or near the upper end of both the pretreatment tank 12 and the aeration tank 14, and having first and second recirculation pipes 44, 46 extending downwardly from the ends of the connecting pipe 46 and into the wastewater in the respective tanks.

The second recirculation pipe 48 terminates near the bottom of the pretreatment tank 12 to one or more extension arms 50, preferably at least two extension arms extend parallel with the floor of the pretreatment tank 12 and are spaced equiangularly about the second recirculation pipe 48. Each extension arm 50 terminates in a recirculation outlet 52 which is aimed perpendicularly to the length of the arm 50, or roughly tangential to the nearest portion of the circumference of pretreatment tank 12. The extension arms 50 are preferably proximate the floor of the pretreatment tank 12. In this way, the recirculation outlets 52 serve to stir and mix the wastewater in the pretreatment tank 12 as wastewater is discharged from the recirculation outlet 52. As shown in FIG. 1, the recirculation outlets 52 point in opposite directions at the ends of their respective arms 50. In the present invention, a single recirculation outlet 52 is located at the ends of each arm 50. This enables a smaller recirculation pump 42 to have relatively large agitation. Thus, the recirculation outlets 52 impart a circular rotation swirling motion to the fluid in the pretreatment tank 12 thereby inducing an enhanced stirring and swirling motion that mixes the fluid in the pretreatment tank 12 in a stratified manner. For proper functioning of the system 10 it is important that the solids in the pretreatment tank 12 remain suspended but not homogeneously mixed. The rotations swirling of the wastewater in the pretreatment tank 12 caused by the opposing outlets 52 creates a mixture of suspended solids necessary for the system 10 to function to its full capacity of reducing nitrates.

This swirling motion maximizes the surface area of solids in the pretreatment tank 12 so those solids are more effectively broken down. The swirling near the bottom of pretreatment tank 12 mixes where the density of the solids are higher and the carbon concentration is higher in the region where the suspended solids are concentrated. This also serves as the introduction location for autotrophs that are present in the aeration tank 14. These are introduced in the swirling fashion so that autotroph flocks may float near the upper portion of the pretreatment tank 14 where they may be rapidly returned to the aeration tank 14 through the outlet 22. The swirling motion assists in quickly transferring autotroph flocks because the swirling motion tends to push the flocks to the sidewall of the tank, which is where the outlet 22 of the pretreatment tank 12 is located. As wastewater leaves the pretreatment tank 12 through the outlet 22, most of the solids generally remain in the pretreatment tank 12 because of the stratified mixing. As such the wastewater leaving the upper portion of the pretreatment tank 12 is lower in suspended solids than water entering the pretreatment tank 12 recirculation outlets 52. In this manner, solids are generally transferred from the aeration tank 14 to the pretreatment tank 12.

The recirculation pump 42 is in electrical communication with the control panel 26, such that the control panel 26 cycles the recirculation pump 42 on and off according to defined parameters. Preferably, the control panel 26 will be programmed to recirculate wastewater according to parameters that: (1) hydraulically transfer wastewater from the are aeration tank 14 to the pretreatment tank 12 thus transferring nitrates dissolved in the wastewater; (2) transfer suspended solids out of the aeration tank 14 including bacterial flocks and in parallel return bacterial flocks separate from organic suspended waste; and (3) maintain an anoxic environment in the pretreatment tank 12. In other words, the recirculation rate is set so there is little to no free oxygen in the pretreatment tank 12. The little free oxygen, if any, in the pretreatment tank 12 is quickly consumed by either aerobic bacteria that were recirculated from the aeration tank 14 or is consumed by facultative bacteria. Although, there is little or no free oxygen in the environment maintained in the pretreatment tank 12, there is a presence of oxygen bound in the form of compounds in the pretreatment tank 12.

It is desirable to keep the total suspended solids in the aeration tank 14, particularly the outer chamber 34, between 100 mL/L and 300 mL/L. Doing so shifts carbon and suspended solids into the pretreatment tank 12 as described above. In order to control the total suspended solids in the aeration tank's outer chamber 34 (the aeration zone) between 100 and 300 mL/L, an optional optical sensor 55 may be used. This optical sensor 55 detects the amount of suspended solids by measuring the opacity of the water in the outer chamber 34 and is calibrated to signal the recirculation pump 42 to recirculate wastewater back to the pretreatment tank 12. The optical sensor 55 is mounted above the bottom of the outer chamber 34 and preferably above the diffusers 40. Other sensing methods or devices may be used instead of an optical sensor 55, provided the sensor measures the amount of suspended solids in the outer chamber 34. Measuring the particulate in the aeration tank confirms that proper suspended solid transfer is occurring. A skilled technician can preselect a recirculation ratio according to these and other parameters and program the control panel 26 accordingly to achieve the desired TN in the effluent. If this is done, it may be necessary for a technician to adjust the programming in the control panel 26 from time to time to keep the TN in the effluent at the desired value. Further, the control panel 26 may utilize self-calibration, learning, or other algorithms that utilize the information provided by optional optical sensor 55 and flow meter 17 to control the recirculation pump 42 and/or mixer pump 24 to achieve the desired level of suspended solids in the outer chamber 34 of the aeration tank 14.

Typically, wastewater will not enter the wastewater treatment system 10 at a constant flowrate, but will enter intermittently according to the water usage of the adjoining structure, such as when a toilet or shower is used. The recirculation of wastewater from the aeration tank 14 to the pretreatment tank 12 results in the reduction of the nitrogen-based compounds into the external environment such as nitrates and nitrites. These compounds being released into the external environment that have a tendency to lead to eutrophication of bodies of water, and the present wastewater treatment system 10 is ideal for locales where eutrophication is a concern. In situations where wastewater flow is reasonably predictable, a preset recirculation ratio can significantly reduce nitrogen compounds released into the external environment. However, when wastewater inflow volume is not consistent, the control panel 26 changes the pulses to maintain the predetermined level of solids in the aeration tank 14. The distribution of the run time of the recirculation pump 42 is set to maintain the predetermined level of solids in the aeration tank 14.

When the facultative bacteria are in the outer chamber 34, their metabolism will be aerobic. In the outer chamber 34, the aerobic environment will stimulate aerobic metabolism in the obligate aerobes that leads to nitrification. The nitrification in the outer chamber 34 will oxidize ammonia or ammonium to nitrite. Then further aerobic metabolism will oxidize nitrite to nitrate. The recirculation pump 42 recirculates the nitrates in short pulses into the pretreatment tank 12. Although some free oxygen is transferred into the pretreatment tank 12 through recirculation, that relatively small amount of free oxygen is rapidly consumed by the facultative bacteria so that anoxic conditions are continuously maintained within the pretreatment tank 12.

Nitrates recirculated into the pretreatment tank 12 are broken down primarily by facultative bacteria that denitrify through anaerobic metabolism. The anoxic conditions maintained in the pretreatment tank 12 force the facultative bacteria into anaerobic metabolism. The bacteria then denitrify the wastewater in the pretreatment tank 12. Because there is no free oxygen, the bacteria reduce nitrate to produce nitrogen gas, which is discharged to the atmosphere, and thus eliminates nitrates from the system. After denitrification, the wastewater then flows back through the pretreatment tank outlet 22 and into the outer chamber 34 of the aeration tank.

The wastewater treatment system 10 using the optional optical sensor 55 is a closed loop controlled system, and due to the presence of the optical sensor 55, the system 10 can make adjustments to the recirculation duration and occurrence to optimize the elimination of nitrates from the system 10. Calculations needed to distribute the pump run time over a time period (i.e. 24 hours) are made in the control panel 26. The sensor 55 signals the control panel 26 when the level of suspended solids in the outer chamber 34 exceeds 300 mL/L and recirculates the wastewater contained therein when the level exceeds that amount. Additionally, the control panel 26 receives signals from a flow meter 17. The control panel 26 can compute the timing of the pulses that will prevent the level of suspended solids in the outer chamber 34 from exceeding 300 mL/L. Using the signals from the flow meter 17 on the input can mitigate temporary fluctuations in the total suspended solids in the outer chamber 34 during intermittent times of high inflow by increasing pulses of recirculation to keep more solids in the pretreatment tank 12.

Absent recirculation as described herein, the output from the wastewater treatment system 10 would be nitrogen-rich and would potentially lead to eutrophication. TN reduction is achieved, by cycling the wastewater from the aeration tank 14 back to the pretreatment tank 12 at well balanced rate that fosters the growth of facultative bacteria.

The connecting pipe 46 is preferably positioned above the level of the wastewater in the pretreatment tank 12 and the aeration tank 14. As such, the connecting pipe 46 will be at least partially located in the ground in which the wastewater treatment system 10 is buried, and will be a relatively short distance from ground level. As such, the connecting pipe 46 may be positioned above the frost line, such that during cold spells, any fluid remaining in the connecting pipe 46 may have a tendency to freeze. To combat freezing, a weep hole 54 is positioned proximate each end of the connecting pipe 46, which weep holes 54 allow wastewater to drain out of the connecting pipe 46 into the respective tank 12, 14. In this way, between recirculation cycles, connecting pipe 46 will be drained of wastewater, thereby diminishing the chances of freezing.

Recirculation of wastewater from the aeration tank 14 to the pretreatment tank 12 is controlled by the control panel 26, and can be triggered in a number of ways. In one instance, when wastewater treatment system 10 is first installed, expected wastewater output can be approximated based on the size of the attached home and the estimated number of residents. The recirculation rate is pre-programmed in the control panel 26 based on the expected daily wastewater output such that the recirculation pump 42 is programmed to cycle on and off to achieve a desired recirculate rate. The flow meter 17 positioned at the inlet 16 measures the volumetric flow rate of wastewater entering wastewater treatment system 10 which measurement is used to achieve a desired recirculation pump 42 run time. The control panel 26 cycles the recirculation pump 42 on and off to bring the recirculation rate to a desired recirculation ratio to bring about the ideal environment in the wastewater treatment system 10 for growth of facultative bacteria. The recirculation ratio is defined as the ratio of R to I for a given time period such as a 24 hour period, where R is defined as recirculation rate which is the volumetric flow rate of wastewater recirculated from the aeration tank 14 to the pretreatment tank 12 and I is defined as the inflow rate which is the volumetric flow rate of wastewater entering the pretreatment tank 12 through the inlet 16. The volume of water that must be recirculated depends on the inflow of wastewater.

Operation of the wastewater treatment system 10 of this invention will not discharge solids from the system 10. The solids are shifted from the aeration tank 14 to the pretreatment tank 12. As such, the solids will accumulate in the pretreatment tank 12 proportionately with the influent load on the system 10. The solids, commonly referred to as sludge, are retained in the system 10 for a long period of time which permits overall nitrates released from the system 10 to be extremely low.

As illustrated in FIG. 1, the inlets and outlets 16, 22, 38 and 18 are all generally in a common plane. In this configuration, wastewater moves through wastewater treatment system 10 generally from left to right by the flow of gravity.

The recirculation pump 42 moves the wastewater from the aeration tank 14 upstream to the pretreatment tank 12.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method of treating wastewater:
providing a pretreatment tank having an inlet and an outlet, said inlet receiving wastewater influent from a wastewater source, said pretreatment tank having a constant wastewater fluid level, said outlet located at a top surface of said wastewater fluid level;
providing an aeration tank having an inlet in fluid communication with an outer chamber and an outlet, said outer chamber surrounding an inner chamber, said inlet of said aeration tank in fluid communication with said outlet of said pretreatment tank and receiving said wastewater from said pretreatment tank, said aeration tank having a constant wastewater level;
passively transferring said wastewater from said pretreatment tank to said outer chamber of said aeration tank;
constantly aerating said outer chamber of said aeration tank to provide aerobic conditions that maintain a colony of aerobic bacteria that induce nitrification;
providing a recirculating pump to pump a portion of said wastewater in said outer chamber of said aeration tank to said pretreatment tank in pulses, said portion of said wastewater being recirculated wastewater;
maintaining suspended solids in said aeration tank at a predetermined level by pulsing said recirculating pump when said suspended solids in said aeration tank exceed said predetermined level;
discharging said recirculated wastewater from recirculation outlets adjacent a floor in said pretreatment tank, said recirculation outlets being pointed in opposite directions to impart rotational stirring of said wastewater in said pretreatment tank;
maintaining anaerobic conditions in said pretreatment tank to maintain a stable colony of anaerobic bacteria said pretreatment tank; and
recirculating said wastewater from said outer chamber of said aeration tank while aerating wastewater in said outer chamber.

2. The method of claim 1, wherein said inlet of said pretreatment tank includes a flow meter for measuring said wastewater received in said inlet of said pretreatment tank.

3. The method of claim 1, wherein a control panel receives a signal from a sensor in said aeration tank and pulses said recirculation pump when said sensor sends a signal that said suspended solids in said aeration tank exceed a predetermined level.

4. The method of claim 3, wherein said sensor is an optical sensor that detects the opacity of said wastewater in said aeration tank.

5. The method of claim 1, further comprising aerating said wastewater in said outer chamber of said aeration tank while sensing said suspended solids.

* * * * *